(12) United States Patent
Menon et al.

(10) Patent No.: US 12,151,267 B2
(45) Date of Patent: Nov. 26, 2024

(54) COMPOSITIONS AND METHODS FOR CLEANING AUTOMOTIVE SURFACES

(71) Applicant: Energizer Auto, Inc., St. Louis, MO (US)

(72) Inventors: Rajeev Menon, St. Louis, MO (US); Ashot K. Serobian, St. Louis, MO (US); Cindy Luna-Zaragoza, St. Louis, MO (US)

(73) Assignee: Energizer Auto, Inc., St. Louis, MO (US)

( * ) Notice: Subject to any disclaimer, the term of this patent is extended or adjusted under 35 U.S.C. 154(b) by 0 days.

(21) Appl. No.: 18/320,772

(22) Filed: May 19, 2023

(65) Prior Publication Data

US 2024/0010957 A1    Jan. 11, 2024

Related U.S. Application Data

(62) Division of application No. 16/491,473, filed as application No. PCT/US2018/020890 on Mar. 5, 2018, now Pat. No. 11,692,157.

(60) Provisional application No. 62/578,240, filed on Oct. 27, 2017, provisional application No. 62/486,222, filed on Apr. 17, 2017, provisional application No. 62/467,584, filed on Mar. 6, 2017.

(51) Int. Cl.
| | |
|---|---|
| *B08B 1/14* | (2024.01) |
| *B08B 3/08* | (2006.01) |
| *B60S 1/66* | (2006.01) |
| *C11D 7/26* | (2006.01) |
| *C11D 7/50* | (2006.01) |
| *C11D 17/04* | (2006.01) |

(52) U.S. Cl.
CPC ............... *B08B 1/143* (2024.01); *B08B 3/08* (2013.01); *C11D 7/26* (2013.01); *C11D 7/263* (2013.01); *C11D 7/5027* (2013.01); *C11D 17/049* (2013.01); *B60S 1/66* (2013.01); *C11D 2111/14* (2024.01)

(58) Field of Classification Search
CPC ....... C11D 11/0023; C11D 7/26; C11D 7/263; C11D 7/5027; C11D 17/049; C11D 17/0043; C11D 3/43; C11D 3/373; C11D 3/18; B08B 1/006; B08B 3/08; B60S 1/66; C08L 83/00; C08L 83/04; C08L 33/10
See application file for complete search history.

(56) References Cited

U.S. PATENT DOCUMENTS

| | | | |
|---|---|---|---|
| 4,670,171 A | 6/1987 | Magyar | |
| 5,082,590 A | 1/1992 | Araud | |
| 5,904,758 A | 5/1999 | Kucala, III | |
| 7,399,738 B1 | 7/2008 | Serobian | |
| 8,168,578 B2 | 5/2012 | Serobian | |
| 8,829,092 B2 | 9/2014 | Nercissiantz et al. | |
| 9,546,274 B2 | 1/2017 | Serobian et al. | |
| 10,611,987 B2 | 4/2020 | Panandiker et al. | |
| 2005/0250668 A1 | 11/2005 | Serobian | |
| 2006/0003913 A1 | 1/2006 | Boutique et al. | |
| 2007/0128962 A1 | 6/2007 | Serobian | |
| 2007/0275867 A1* | 11/2007 | Serobian | C09G 1/16 510/466 |
| 2012/0252923 A1* | 10/2012 | Serobian | C08L 83/04 523/102 |
| 2014/0242195 A1 | 8/2014 | Dixon | |
| 2016/0264914 A1 | 9/2016 | Adams | |
| 2016/0355755 A1 | 12/2016 | Brooker et al. | |
| 2020/0032175 A1 | 1/2020 | Menon | |

OTHER PUBLICATIONS

Great Britain Office Action mailed Jan. 23, 2023 for Great Britain Patent Application No. 2219310.6, a foreign counterpart to US Patent No., 5 pages.
Great Britain Office Action mailed Feb. 8, 2022 for Great Britain Patent Application No. 1912790.1, a foreign counterpart to U.S. Appl. No. 16/491,473, 3 pages.
Great Britain Office Action mailed Sep. 16, 2022 for Great Britain Patent Application No. 1912790.1, a foreign counterpart to U.S. Appl. No. 16/491,473, 4 pages.
International Search Report for International Application No. PCT/US2018/020890, mailed Jun. 15, 2018, 2 pages.
International Preliminary Report on Patentability mailed Sep. 10, 2019, and International Search Report mailed Jun. 5, 2018, from corresponding PCT Patent Application No. PCT/US2018/020890, 6 pages.
US Office Action for U.S. Appl. No. 16/491,473, mailed Jul. 6, 2022, Menon, "Compositions and Methods for Cleaning Automotive Surfaces", 11 pages.

* cited by examiner

*Primary Examiner* — Duy Vu N Deo
*Assistant Examiner* — Christopher Remavege
(74) *Attorney, Agent, or Firm* — Lee & Hayes, P.C.

(57) ABSTRACT

An automotive surface is cleaned by applying an effective amount of a cleaning composition comprising a) at least one hydrocarbon solvent in an amount from about 3 weight percent to about 20 weight percent of the composition, b) at least one thickener/rheology modifier in an amount from about 0.01 weight percent to about 3 weight percent, c) at least one silicone fluid has a viscosity ranging from about 500 to about 20,000 centistokes at 25° C., present in an amount from about 0.1 weight percent to about 3 weight percent, d) at least one wetting agent in an amount from about 0.001 to about 2%, e) at least one hydrophobic additive in an amount from about 0.1 to about 3%, and f) water in an amount from about 60 weight percent to about 85 weight percent to the automotive surface with an application implement.

13 Claims, No Drawings

COMPOSITIONS AND METHODS FOR CLEANING AUTOMOTIVE SURFACES

CROSS-REFERENCE TO RELATED APPLICATIONS

This application is a divisional of co-pending U.S. application Ser. No. 16/491,473, filed Sep. 5, 2019, which claims priority to International Application No. PCT/US2018/020890, filed Mar. 5, 2018, which claims the benefit of U.S. Provisional Application No. 62/578,240, filed Oct. 27, 2017; U.S. Provisional Application No. 62/486,222, filed Apr. 17, 2017; and U.S. Provisional Application No. 62/467,584, filed Mar. 6, 2017; all of which are incorporated herein by reference in their entireties.

FIELD OF THE INVENTION

This disclosure relates to compositions (e.g., partially neutralized water-based emulsions) that effectively clean and remove debris (e.g., bugs, tar, dirt, etc.) from automotive exterior surfaces (e.g., automotive paint surfaces), processes for preparing the compositions, methods for cleaning automotive surfaces, and to automotive surfaces coated with the compositions.

BACKGROUND OF THE INVENTION

During the summer time, roads can reach high enough temperatures which can soften the asphalt road surface, causing it to release petroleum based oils. These road oils and greases get flung as vehicles pass through the roads, inevitably landing on the exterior of vehicles, which are difficult to remove once hardened.

Insects and bugs are also another issue which can plague the roads. When bugs come upon high impact to vehicles surfaces, they release acidic fluids. If not removed promptly, the acidic fluids will etch into the clear coat and paint, damaging the surface. They will also become harder to remove the longer they remain on the surface.

Existing products can contain potentially harmful chemicals which can cause damage if left on surface for a long time and after constant use. These chemicals include aromatic hydrocarbons and citrus derived oils such as d-limonene. These products containing these chemicals can cause damage to delicate surfaces such as the clear coat, paint, wheels, plastic and glass if misused by user.

It is well known in the industry that the combination of surfactant, organic solvents and water provide good cleaning ability. Many existing bug and tar cleaners contain large quantities of solvents, ranging from 30 to 60 wt % or greater.

For example, U.S. Patent Application Publication No. 2007/0135325 A1 discloses a composition for thinning and paint cleanup, wherein the composition is a solvent external emulsion and comprises organic solvents, surfactant and water. The concentration of organic solvent in the composition is from 16 to 90 wt %.

SUMMARY OF THE INVENTION

A method of cleaning an automotive surface comprises applying an effective amount of a cleaning composition comprising:
  a) at least one hydrocarbon solvent in an amount from about 3 weight percent to about 20 weight percent of the composition,
  b) at least one thickener/rheology modifier in an amount from about 0.01 weight percent to about 3 weight percent of the composition,
  c) at least one silicone fluid has a viscosity ranging from about 500 to about 20,000 centistokes at 25° C., present in an amount from about 0.1 weight percent to about 3 weight percent of the composition,
  d) at least one wetting agent in an amount from about 0.001 to about 2%,
  e) at least one hydrophobic additive in an amount from about 0.1 to about 3%, and
  f) water in an amount from about 60 weight percent to about 85 weight percent of the composition
to the automotive surface; and
distributing the cleaning composition onto the automotive surface with an application implement.

In particular, the present method effectively cleans and removes debris (e.g., bugs, tar, dirt, etc.) from automotive exterior surfaces (e.g., automotive paint surfaces).

The present method is carried out using a composition that contains low levels of solvents. Because the present compositions contain less solvent, volatile organic compounds limits can be met, as well as concerns in regard to safety and hazardous waste disposal.

DETAILED DESCRIPTION OF PRESENTLY PREFERRED EMBODIMENTS

The embodiments of the present invention described below are not intended to be exhaustive or to limit the invention to the precise forms disclosed in the following detailed description. Rather a purpose of the embodiments chosen and described is so that the appreciation and understanding by others skilled in the art of the principles and practices of the present invention can be facilitated.

For purposes of this disclosure, exterior surfaces of automobiles and other vehicles is meant to be interpreted broadly and includes an automobile or other vehicle body, trim, wheels, wheel covers, and tires. Vehicles other than automobiles include, e.g., motorcycles, bicycles and trucks. In addition, the surface to be treated in accordance with the present disclosure can be that of a stationary article having a hard surface. The surface to be treated may be clean, dirty, new or moderately oxidized and may be cool or hot.

The compositions used in the present method comprise at least one hydrocarbon solvent in an amount from about 3 weight percent to about 20 weight percent of the composition.

A solvent is included in the compositions of the present disclosure to assist in removing dirt, grease, and other unwanted impurities from the surface to be treated. The particular solvent employed in the inventive composition may be selected depending on the particular end use application, and particularly on the type of surface to be treated. In addition, the solvent may serve to help solubilize non-water soluble or poorly water soluble adjuvants, such as ultraviolet light (UV) absorbers, fragrances, perfumes and the like, for the purpose of preventing separation of these ingredients in the inventive compositions. Suitable solvents include both hydrophilic and hydrophobic compounds, generally comprising solvents that are water soluble, water-miscible as well as water insoluble and water-immiscible compounds. Mixtures of any solvent may optionally be employed in the inventive compositions. A preferred solvent for use in the compositions of this disclosure is a paraffinic naphthenic solvent available from Sasol as LPA-210.

Suitable organic solvents include, but are not limited to, monohydric alcohols and polyhydric alcohols, such as for example $C_{1-6}$ alkanols and $C_{1-6}$ diols, alkylene glycols, such as for example $C_{1-10}$ alkyl ethers of alkylene glycols, glycol ethers, such as for example $C_{3-24}$ alkylene glycol ethers, polyalkylene glycols, short chain carboxylic acids, short chain esters, isoparaffinic hydrocarbons, mineral spirits, alkylaromatics, terpenes, terpene derivatives, terpenoids, terpenoid derivatives, formaldehyde, and pyrrolidones. Alkanols include, but are not limited to the monohydric alcohols including for example methanol, ethanol, n-propanol, isopropanol, butanol, pentanol, and hexanol, and isomers thereof. Diols include, but are not limited to, methylene, ethylene, propylene and butylene glycols. Alkylene glycol ethers include, but are not limited to; ethylene glycol monopropyl ether, ethylene glycol monobutyl ether, ethylene glycol monohexyl ether, diethylene glycol monopropyl ether, diethylene glycol monobutyl ether, diethylene glycol monohexyl ether, propylene glycol methyl ether, propylene glycol ethyl ether, propylene glycol n-propyl ether, propylene glycol monobutyl ether, propylene glycol t-butyl ether, di- or tri-polypropylene glycol methyl or ethyl or propyl or butyl ether, acetate and propionate esters of glycol ethers. Short chain carboxylic acids include, but are not limited to, acetic acid, glycolic acid, lactic acid and propionic acid. Short chain esters include, but are not limited to, glycol acetate, and cyclic or linear volatile methylsiloxanes. Water insoluble solvents such as isoparaffinic hydrocarbons, mineral spirits, alkylaromatics, terpenoids, terpenoid derivatives, terpenes, and terpenes derivatives can be mixed with a water soluble solvent when employed.

Examples of organic solvent having a vapor pressure less than 0.1 mm Hg (20° C.) include, but are not limited to, dipropylene glycol n-propyl ether, dipropylene glycol t-butyl ether, dipropylene glycol n-butyl ether, tripropylene glycol methyl ether, tripropylene glycol n-butyl ether, diethylene glycol propyl ether, diethylene glycol butyl ether, dipropylene glycol methyl ether acetate, diethylene glycol ethyl ether acetate, and diethylene glycol butyl ether acetate (all-available from ARCO Chemical Company).

The compositions used in the present method comprise at least one thickener/rheology modifier in an amount from about 0.01 weight percent to about 3 weight percent of the composition.

The compositions contain at least one rheology modifier and/or thickener that contribute to both thickening and the rheological structure. The at least one rheology modifier and/or thickener may be selected from the group consisting of organic polymers, natural polymers, inorganic thickeners, and their derivatives. Mixtures of the rheology modifiers and/or thickeners may also be suitably employed.

In general, any suitable organic polymer may be employed as a rheology modifier, such organic polymer generally referring to the class of synthetic or man-made polymers. The compositions may employ water-soluble or water dispersible polymers. The compositions may employ nonionic (neutral and/or non-ionizable), anionic and/or cationic polymers, and their mixtures. Suitable anionic polymers include those with ionizable groups that are at least partially anionic in solution, that is carrying a negative charge in solution, or which can be at least partially or fully neutralized to be at least partially or fully anionic in solution. Suitable cationic polymers include polymers that are ionizable (i.e. capable of being protonated) and those with permanent cationic groups, that is carrying a permanent positive charge, in solution. The compositions may employ hydrophilic polymers, hydrophobic polymers or polymers exhibiting both properties owing to the presence of hydrophilic and hydrophobic monomer moieties. Suitable hydrophilic polymers are those that are attracted to surfaces and are absorbed thereto without covalent bonds. Examples of suitable polymers include the polymers and co-polymers of N,N-dialkyl acrylamide, acrylamide, and certain monomers containing substituted and/or unsubstituted quaternary ammonium groups and/or amphoteric groups that favor substantivity to surfaces, along with co-monomers that favor adsorption of water, such as, for example, acrylic acid and other acrylate salts, sulfonates, betaines, and ethylene oxides. Water soluble or water dispersible cationic polymers may be suitable for their charge dissipative effect, antistatic, surface lubricating and potential softening benefits.

With respect to the synthesis of a water soluble or water dispersible cationic copolymer, the level of the first monomer, which has a permanent cationic charge or that is capable of forming a cationic charge on protonation, is typically between 3 and 80 mol % or alternatively between 10 to 60 mol % of the copolymer. The level of second monomer, which is an acidic monomer that is capable of forming an anionic charge in the composition, when present is typically between 3 and 80 mol % or alternatively between 10 to 60 mol % of the copolymer. The level of the third monomer, which has an uncharged hydrophilic group, when present is typically between 3 and 80 mol % or alternatively between 10 to 60 mol % of the copolymer. When present, the level of uncharged hydrophobic monomer is less than about 50 mol % or alternatively less than 10 mol % of the copolymer. The molar ratio of the first monomer to the second monomer typically ranges from 19:1 to 1:10 or alternatively ranges from 9:1 to 1:6. The molar ratio of the first monomer to the third monomer is typically ranges from 4:1 to 1:4 or alternatively ranges from 2:1 to 1:2.

The average molecular weight of the copolymer typically ranges from about 5,000 to about 10,000,000, with the suitable molecular weight range depending on the polymer composition with the proviso that the molecular weight is selected so that the copolymer is water soluble or water dispersible to at least 0.01% by weight in distilled water at 25° C.

Examples of permanently cationic monomers include, but are not limited to, quaternary ammonium salts of substituted acrylamide, methacrylamide, acrylate and methacrylate, such as trimethylammoniumethylmethacrylate, trimethylammoniumpropylmethacrylamide, trimethylammoniumethylmethacrylate, trimethylammoniumpropylacrylamide, 2-vinyl N-alkyl quaternary pyridinium, 4-vinyl N-alkyl quaternary pyridinium, 4-vinylbenzyltrialkylammonium, 2-vinyl piperidinium, 4-vinyl piperidinium, 3-alkyl I-vinyl imidazolium, diallyldimethylammonium, and the ionene class of internal cationic monomers as described by D. R. Berger in Cationic Surfactants, Organic Chemistry, edited by J. M. Richmond, Marcel Dekker, New York, 1990, ISBN 0-8247-8381-6, which is incorporated herein by reference. This class includes co-poly ethylene imine, co-poly ethoxylated ethylene imine and co-poly quaternized ethoxylated ethylene imine, co-poly [(dimethylimino)trimethylene (dimethylimino)hexamethylene disalt], co-poly [(diethylimino) trimethylene (dimethylimino)trimethylene disalt], co-poly [(dimethylimino)2-hydroxypropyl salt], co-polyquarternium-2, co-polyquarternium-17, and co-polyquarternium-18, as described in the International Cosmetic Ingredient Dictionary, 5th Edition, edited by J. A. Wenninger and G. N. McEwen, which is incorporated herein by reference. Other cationic monomers include those containing cationic sulfonium salts such as co-poly-1-[3-methyl-4-(vinyl-benzyloxy)

phenyl]tetrahydrothiopheni-um chloride. Especially suitable monomers are mono- and di-quaternary derivatives of methacrylamide. The counterion of the cationic co-monomer can be selected from, for example, chloride, bromide, iodide, hydroxide, phosphate, sulfate, hydrosulfate, ethyl sulfate, methyl sulfate, formate, and acetate.

Examples of monomers that are cationic on protonation include, but are not limited to, acrylamide, N,N-dimethylacrylamide, N,N di-isopropylacryalmide, N-vinylimidazole, N-vinylpyrrolidone, ethyleneimine, dimethylaminohydroxypropyl diethylenetriamine, dimethylaminoethylmethacrylate, dimethylaminopropyl-methacryl-amide, dimethylaminoethylacrylate, dimethylaminopropylacrylamide, 2-vinyl pyridine, 4-vinyl pyridine, 2-vinyl piperidine, 4-vinylpiperidine, vinyl amine, diallylamine, methyldiallylamine, vinyl oxazolidone; vinyl methyoxazolidone, and vinyl caprolactam.

Monomers that are cationic on protonation typically contain a positive charge over a portion of the pH range of 2-11. Such suitable monomers are also presented in Water-Soluble Synthetic Polymers: Properties and Behavior, Volume II, by P. Molyneux, CRC Press, Boca Raton, 1983, ISBN 0-8493-6136. Additional monomers can be found in the International Cosmetic Ingredient Dictionary, 5th Edition, edited by J. A. Wenninger and G. N. McEwen, The Cosmetic, Toiletry, and Fragrance Association, Washington D.C., 1993, ISBN 1-882621-06-9. A third source of such monomers can be found in Encyclopedia of Polymers and Thickeners for Cosmetics, by R. Y. Lochhead and W. R. Fron, Cosmetics & Toiletries, vol. 108, May 1993, pp 95-135. All three references are incorporated herein.

Examples of acidic monomers that are capable of forming an anionic charge in the composition include, but are not limited to, acrylic acid, methacrylic acid, ethacrylic acid, dimethylacrylic acid, maleic anhydride, succinic anhydride, vinylsulfonate, cyanoacrylic acid, methylenemalonic acid, vinylacetic acid, allylacetic acid, ethylidine-acetic acid, propylidineacetic acid, crotonic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, citraconic acid, vinylbenzoic acid, N-vinylsuccinamidic acid, mesaconic acid, methacroylalanine, acryloylhydroxyglycine, sulfoethyl methacrylate, sulfopropyl acrylate, and sulfoethyl acrylate. Exemplary acid monomers also include styrenesulfonic acid, 2-methacryloyloxymethane-1-sulfonic acid, 3-methacryloyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid and vinyl phosphoric acid. Suitable monomers include acrylic acid, methacrylic acid and maleic acid. The copolymers useful in this disclosure may contain the above acidic monomers and the alkali metal, alkaline earth metal, and ammonium salts thereof.

Examples of monomers having an uncharged hydrophilic group include but are not limited to vinyl alcohol, vinyl acetate, vinyl methyl ether, vinyl ethyl ether, ethylene oxide and propylene oxide. Also suitable are hydrophilic esters of monomers, such as hydroxyalkyl acrylate esters, alcohol ethoxylate esters, alkylpolyglycoside esters, and polyethylene glycol esters of acrylic and methacrylic acid.

Finally, examples of uncharged hydrophobic monomers include, but are not limited to, C1-C4 alkyl esters of acrylic acid and of methacrylic acid.

Suitable copolymers are formed by copolymerizing the desired monomers. Conventional polymerization techniques can be employed. Illustrative techniques include, for example, solution, suspension, dispersion, or emulsion polymerization. An exemplary method of preparation is by precipitation or inverse suspension polymerization of the copolymer from a polymerization media in which the monomers are dispersed in a suitable solvent. The monomers employed in preparing the copolymer may be water soluble or sufficiently soluble in the polymerization media to form a homogeneous solution. They readily undergo polymerization to form polymers which are water-dispersible or water-soluble. The exemplary copolymers contain acrylamide, methacrylamide and substituted acrylamides and methacrylamides, acrylic and methacrylic acid and esters thereof. Suitable synthetic methods for these copolymers are described, for example, in Kirk-Othmer, Encyclopedia of Chemical Technology, Volume 1, Fourth Ed., John Wiley & Sons.

Other examples of polymers that provide sheeting and anti-spotting benefits are polymers that contain amine oxide hydrophilic groups. Polymers that contain other hydrophilic groups such as sulfonate, pyrrolidone, and/or carboxylate groups can also be used. Examples of desirable polysulfonate polymers include polyvinylsulfonate, and also include polystyrene sulfonate, such as those sold by Mono-mer-Polymer Dajac (1675 Bustleton Pike, Feasterville, Pa. 19053). A typical formula is as follows: [CH(C6H4SO3Na)—CH2]n-CH(C6H5)-CH2 wherein n is a number to give the appropriate molecular weight as disclosed below.

Typical molecular weights are from about 10,000 to about 1,000,000, or alternatively from about 200,000 to about 700,000. Exemplary polymers containing pyrrolidone functionalities include polyvinyl pyrrolidone, quaternized pyrrolidone derivatives (such as Gafquat 755N from International Specialty Products), and co-polymers containing pyrrolidone, such as polyvinylpyrrolidone/dimethylaminoethyl-methacrylate (available from ISP) and polyvinyl pyrrolidone/acrylate (available from BASF). Other materials can also provide substantivity and hydrophilicity including cationic materials that also contain hydrophilic groups and polymers that contain multiple ether linkages. Cationic materials include cationic sugar and/or starch derivatives and the typical block copolymer detergent surfactants based on mixtures of polypropylene oxide and ethylene oxide are representative of the polyether materials. The polyether materials are less substantive, however.

Also suitable are polymers comprising water-soluble amine oxide moieties. It is believed that the partial positive charge of the amine oxide group can act to adhere the polymer to the surface of the surface substrate, thus allowing water to "sheet" more readily. To the extent that polymer anchoring promotes better "sheeting", then higher molecular materials are suitable. Increased molecular weight improves efficiency and effectiveness of the amine oxide-based polymer. Suitable polymers of this disclosure may have one or more monomeric units containing at least one N-oxide group. At least about 10%, suitably more than about 50%, more suitably greater than about 90% of said monomers forming said polymers contain an amine oxide group. These polymers can be described by the general formula: P(B) wherein each P is selected from homopolymerizable and copolymerizable moieties which attach to form the polymer backbone, suitably vinyl moieties, e.g. $C(R)2=C(R)2$, wherein each R is H, C1-C12, alternatively C1-C4 alkyl (ene), C6-C12 aryl(ene) and/or B; B is a moiety selected from substituted and unsubstituted, linear and cyclic C1-C12 alkyl, C1-C12 alkylene, C1-C12 heterocyclic, aromatic C6-C12 groups and wherein at least one of said B moieties has at least one amine oxide group present; u is from a number that will provide at least about 10% monomers containing an amine oxide group to about 90%; and t is a number such that the average molecular weight of the polymer is from about 2,000 to about 500,000, alternatively from about 5,000 to about 250,000, and also alternatively from about 7,500 to about 200,000. Exemplary polymers also include poly(4-vinylpyridine N-oxide)polymers (PVNO), wherein the average molecular weight of the polymer is from about 2,000 to about 500,000, alternatively from about 5,000 to about 400,000, and also alternatively from about 7,500 to about 300,000. In general, higher molecular weight polymers are suitable. Often, higher molecular weight polymers allow for use of lower levels of the polymer, which can provide benefits in surface cleaner applications of the compositions. Lower molecular weights for the exemplary poly-amine oxide polymers of the present disclosure are due to greater difficulty in manufacturing these polymers in higher molecular weight.

Some non-limiting examples of homopolymers and copolymers which can be used as water soluble polymers of the present disclosure are: adipic acid/dimethyl-amino-hydroxypropyl diethylenetriamine copolymer; adipic acid/epoxy-propyl diethylenetriamine copolymer; polyvinyl alcohol; methacryloyl ethyl betaine/methacrylates copolymer; ethyl acrylate/methyl methacrylate/methacrylic acid/acrylic acid copolymer; polyamine resins; and polyquaternary amine resins; poly(ethenylformamide); poly-(vinylamine) hydrochloride; poly(vinyl alcohol-co-vinylamine); poly(vinyl alcohol-co-vinylamine); poly(vinyl alcohol-co-vinylamine hydrochloride); and poly(vinyl alcohol-co-vinylamine hydrochloride). Alternatively, said copolymer and/or homopolymers are selected from the group consisting of adipic acid/dimethylaminohydroxypropyl diethylenetriamine copolymer; poly(vinylpyrrolidone/dimethylaminoethyl methacrylate); polyvinyl alcohol; ethyl acrylate/methyl methacrylate/ethacrylic acid/acrylic acid copolymer; methacryloyl ethyl betaine/methacrylates copolymer; polyquaternary amine resins; poly(ethenylformamide); poly(vinylamine)hydrochloride; poly(vinyl alcohol-co-vinylamine); poly(vinyl alcohol-co-vinylamine); poly(vinyl alcohol-co-vinylamine hydrochloride); and poly(vinyl alcohol-co-vinylamine hydrochloride).

Polymers useful in the present disclosure can be selected from the group consisting of copolymers of hydrophilic monomers. The polymer can be linear random or block copolymers, and mixtures thereof. The term "hydrophilic" is used herein consistent with its standard meaning of having at least some affinity for water. As used herein in relation to monomer units and polymeric materials, including the copolymers, "hydrophilic" means substantially water soluble and/or substantially water dispersible. In this regard, "substantially water soluble" or "substantially water dispersible" shall refer to a material that is soluble and/or dispersible in distilled (or equivalent) water, at 25° C., at a concentration of about 0.0001% by weight or greater. The terms "soluble", "solubility", "dispersible", and the like, for purposes hereof, correspond to the maximum concentration of monomer or polymer, as applicable, that can dissolve or disperse in water and/or other solvents, or their mixtures, to form a homogeneous solution, as is well understood to those skilled in the art.

Nonlimiting examples of useful hydrophilic monomers are unsaturated organic mono- and polycarboxylic acids, such as acrylic acid, methacrylic acid, crotonic acid, maleic acid and its half esters, itaconic acid; unsaturated alcohols, such as vinyl alcohol, allyl alcohol; polar vinyl heterocyclics, such as, vinyl caprolactam, vinyl pyridine, vinyl imidazole; vinyl amine; vinyl sulfonate; unsaturated amides, such as acrylamides, e.g., N,N-dimethylacrylamide, N-t-butyl acrylamide; hydroxyethyl methacrylate; dimethylaminoethyl methacrylate; salts of acids and amines listed above; and the like; and mixtures thereof. Some exemplary hydrophilic monomers are acrylic acid, methacrylic acid, N,N-dimethyl acrylamide, N,N-dimethyl methacrylamide, N-t-butyl acrylamide, dimethylamino ethyl methacrylate, thereof, and mixtures thereof.

Polycarboxylate polymers are those formed by polymerization of monomers, at least some of which contain carboxylic functionality. Common monomers include acrylic acid, maleic acid, ethylene, vinyl pyrrolidone, methacrylic acid, methacryloylethylbetaine, etc. Exemplary polymers for substantivity are those having higher molecular weights. For example, polyacrylic acid having molecular weights below about 10,000 are not particularly substantive and therefore do not normally provide hydrophilicity for three rewettings of a treated surface with the compositions, although with higher levels molecular weights down to about 1000 can provide some results. In general, the polymers should have molecular weights of more than about 10,000. It has also been found that higher molecular weight polymers, e.g., those having molecular weights of more than about 10,000,000, are extremely difficult to formulate and are less effective in providing anti-spotting benefits than lower molecular weight polymers.

Accordingly, the molecular weight should normally be, especially for polyacrylates, from about 1,000 to about 10,000,000; alternatively from about 5,000 to about 5,000,000; alternatively from about 10,000 to about 2,500,000; and also suitably from about 20,000 to about 1,000,000.

Non-limiting examples of polymers for use in the present disclosure include the following: poly(vinyl pyrrolidone/acrylic acid) sold under the name "Acrylidone"® by ISP and poly(acrylic acid) sold under the name "Accumer"® by Rohm & Haas. Other suitable materials include sulfonated polystyrene polymers sold under the name Versaflex® sold by National Starch and Chemical Company, especially Versaflex 7000.

Suitable polymers may be selected from the group consisting of water soluble and water dispersible polyacrylate polymers and copolymers containing at least one acrylate monomer, water swellable and alkali swellable polyacrylate polymers and copolymers containing at least one acrylate monomer, non-linear polyacrylate polymers cross-linked with at least one polyalkenyl polyether monomer, film-forming and water swellable non-soluble polyacrylate polymers, hydrophobically modified cross-linked polyacrylate polymers and copolymers containing at least one hydrophobic monomer, water dispersible associative and non-associative polyacrylate polymers and copolymers containing at least one acrylate monomer, and mixtures thereof. Examples of hydrophobically modified alkali soluble acrylic polymer emulsions are sold under the name ACUSOL® by Rohm and Haas. In additional suitable polymers, copolymers or derivatives thereof are selected from polyvinyl alcohols, polyvinyl pyrrolidone, polyalkylene oxides, acrylamide, acrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatin, natural gums such as xantham and carrageen. Exemplary polymers are also selected from polyacrylates and water-soluble acrylate copolymers, methylcellulose, carboxymethylcellulose sodium, dextrin, ethylcellulose, hydroxyl-ethyl cellulose, hydroxypropyl methylcellulose, maltodextrin, polymethacrylates. Also suitable are polymers are selected from polyvinyl alcohols, polyvinyl alcohol copolymers, hydroxypropyl methyl cellulose (HPMC), xantham gum and starch. The polymer may have any weight average molecular weight from about 1000 to 1,000,000, or even from 10,000 to 300,000 or even from 15,000 to 200,000 or even from 20,000 to 150,000.

Also useful are polymer blend compositions, for example blends comprising a hydrolytically degradable and water-soluble polymer blend such as polylactide and polyvinyl alcohol, achieved by the mixing of polylactide and polyvinyl alcohol, typically comprising 1-35% by weight polylactide and approximately from 65% to 99% by weight polyvinyl alcohol, if the material is to be water-dispersible, or water-soluble.

In general, natural polymers and derivatized natural polymers may be employed as rheology modifiers. Some non-limiting examples of natural polymers and derivatized natural polymers suitable for use in the present disclosure include polysaccharide polymers, which include substituted cellulose materials like carboxymethylcellulose, ethyl cellulose, hydroxyethylcellulose, hydroxypropyl-cellulose, hydroxymethylcellulose, succinoglycan and naturally occurring polysaccharide polymers like xanthan gum, guar gum, locust bean gum, tragacanth gum, carrageen gum or derivatives thereof. Also suitable are polypeptides and proteins, for example, but not limited to gelatin and gelatin derivatives, peptin, peptone, and the like, as well as polysaccharide and peptide copolymers, such as peptidoglycans and the like.

Also suitable for use as rheology modifiers are inorganic thickeners, generally in the form of fine particulate additives including colloids and nanoparticulates. Examples of such inorganic thickeners include, but are not limited to materials such as natural clays, silicas, zeolites, finely divided metal oxides, finely divided inorganic minerals and nanoparticulate forms of such materials, and their mixtures. Also included are derivatized inorganic thickening agents, such as for example, fumed silica, silanized silica and hydrophobized silica, and the like. Examples of metal oxides include, but are not limited to, oxides of alkali metals, alkaline earth metals, transition metals of the Group IIA, IVB, VB, VIIB, VIII, IB, IIB, IIA and IVA periodic groups.

Illustrative rheology modifiers useful in the compositions of this disclosure include, for example, Acusol® 801s (synthetic hydrophobically modified acrylic swellable polymer emulsion) available from Dow Chemical Company, Acusol® 820 (hydrophobically modified alkali soluble acrylic polymer emulsion) available from Dow Chemical Company, Novemer® EC-1 (blend of acrylates, acrylamide copolymer, mineral oil and polysorbate 85) available from Lubrizol Corporation, and the like.

In suitable embodiments, the rheology modifier and/or thickener comprises 0.0001% by weight to about 15% by weight, or 0.001% by weight to about 10% by weight, or alternatively 0.01% by weight to about 5% by weight of the composition.

The compositions used in the present method comprise at least one silicone fluid has a viscosity ranging from about 500 to about 20,000 centistokes at 25° C., present in an amount from about 0.1 weight percent to about 3 weight percent of the composition.

These silicone fluids (also known as "polyorganosiloxane fluids") are also commonly polydiorganosiloxanes and are referred to as "silicone oils" or "silicones" and are distinguished from silicone elastomers and resins, which are more thoroughly cross-linked than silicone oils.

The polyorganosiloxane fluids used in the present disclosure are preferably polydiorganosiloxane fluids selected from the group consisting of silicone oils having the general formula: $(RnSiO_{((4-n)/2))m}$
wherein n is between 0 and 3, m is 2 or greater, and R is selected from the group consisting of alkyl, alkylene, allyl, aryl, benzyl, phenyl, amine, amide, vinyl, fluoroalkyl, perfluoroalkane, carboxyester and quaternary alkyl ammonium radicals, and mixtures thereof.

Additional suitable polydiorganosiloxanes are defined in Silicone Compounds Register and Review, 5th Edition, R. Anderson, G. L. Larson and C. Smith Eds., Huls America Inc., Piscataway, N.J., p. 247 (1991), the disclosure of which is incorporated herein by reference.

These example silicones can be linear or branched. Various naming conventions and nomenclature that are essentially equivalent to this exemplary class of silicones, include, but are not limited to: dialkylpolysiloxane hydrolyzate; alpha-alkyl-omega-methoxypolydialkylsiloxane; polydialkyl silicone oil; poly(dialkyl-siloxane); alkyl end-blocked polydialkylsiloxane; polyoxy(dialkylsilylene), alpha-(trialkylsilyl)-omega-hydroxy; poly[oxy(dialkylsilylene)], alpha-[trialkylsilyl]-omega-[(trialkylsilyl)oxy]; and alpha-(trialkylsilyl)poly[oxy(dialkylsilylene)]-omega-alky. Some additional suitable examples also include dimethicone copolyol, dimethyl-polysiloxane, diethylpolysiloxane, high molecular weight dimethicone, mixed C1-C30 alkyl polysiloxane, phenyl dimethicone, dimethiconol, and mixtures thereof. Non-limiting examples of silicones useful herein are also described in U.S. Pat. No. 5,011,681, the disclosure of which is incorporated herein by reference. The silicone compounds useful herein also include polyalkyl or polyaryl siloxanes. The alkyl or aryl groups substituted on the siloxane chain (R) or at the ends of the siloxane chains can have any structure as long as the resulting silicone remains fluid at or around room temperature. Suitable R groups include hydroxy, methyl, methoxy, ethyl, ethoxy, propyl, propoxy, phenyl, methylphenyl, phenylphenyl, aryl and aryloxy. One or more R groups on the silicon atom may represent the same group or different groups, or any combination thereof.

Suitable silicone compounds are polydimethylsiloxane, polydiethylsiloxane, polymethylphenylsiloxane, polyalkylarylsiloxane, polyethyleneoxydialkylsiloxane, polypropyleneoxydialkylsiloxane, polydialkylcyclosiloxane, and mixtures thereof. Polydimethylsiloxane, which is also known as dimethicone, is suitable and readily available in many forms and grades, including for example, edible grades suitable for use in compositions for food contact usage. The polyalkylsiloxanes that can be used include, for example, polydimethylsiloxanes. These silicone compounds are available, for example, from the General Electric Company in their Viscasil® and SF 96 series, and from Dow Corning in their Dow Corning 200 series.

Other suitable polydiorganosiloxanes include polyalkylaryl siloxane fluids containing one or more alkyl or alkylaryl substituents can also be used, for example, and include, but are not limited to polymethylphenylsiloxanes, poly [(dimethylsiloxane)/methylvinyl-siloxane)], poly[(dimethylsiloxane)/(diphenylsiloxane)], poly [(dimethylsiloxane)/-(phenylmethylsiloxane)], poly [(dimethylsiloxane)/(diphenylsiloxane)/-(methyl-vinylsiloxane)], and mixtures thereof. These siloxanes are available, for example, from the General Electric Company as SF 1075 methyl phenyl fluid or from Dow Corning as 556 Cosmetic Grade Fluid, Rhodorsil 763 from Rhone-Poulenc, Silbione 70641 V 30 and 70641 V 200 from Rhone-Poulenc, the silicones of the PK series from Bayer, such as PK20, the silicones of the PN and PH series from Bayer, such as PN 1000 and PH 1000, and certain oils of the SF series from General Electric, such as SF 1250, SF 1265, SF 1154 and SF 1023.

Organo-modified silicones useful in the present disclosure are silicones as defined above, containing in their general structure one or more organofunctional groups directly attached to the siloxane chain or attached via a hydrocarbon-based radical. Examples include silicones containing: a) polyethyleneoxy and/or polypropyleneoxy groups; b) (per) fluoro groups, for instance trifluoroalkyl groups; c) hydroxyacylamino groups; d) thiol groups; e) carboxylate groups; f) hydroxylated groups; g) alkoxylated groups containing at least 12 carbon atoms; h) acyloxyalkyl groups containing at least 12 carbon atoms; i) quaternary ammonium groups; j) amphoteric or betaine groups; and k) bisulphite groups. See, for example U.S. Patent Application Publication No. 2007/0275867, supra.

The polyorganosiloxanes in the composition are believed to provide a water and water vapor resistant coating upon the surface of the treated materials to enhance their resistant to environmental stresses, such as water permeation, oxygen permeation and assault by other environmental contaminants.

The organopolysiloxanes are also useful for imparting a shine or glossy coating to the treated surfaces, resulting in enhanced appearance and other aesthetic benefits associated with modification of incident light, such as refractive and diffusive contributions to specular reflections that contribute to the perception of enhanced color and tone, and decreased perception of surface defects such as scratches, stress cracks, striations, and other surface defects that commonly develop on surfaces with normal age and wear. Hence, the organopolysiloxanes are useful for their restorative effect when used on aged and worn surfaces.

The polyorganosiloxanes in the composition are also believed to provide a soil, oil, dirt and grime resistant coating upon the surface of the treated materials to enhance their resistant to staining and soiling, water and microbial growth. In one embodiment of the present disclosure, the polyorganosiloxane includes one or more of a silicone selected from polydimethylsiloxane, polydiethylsiloxane, polymethylphenylsiloxane, polyalkylarylsiloxane, polyethyleneoxydialkylsiloxane, polypropyleneoxydialkylsiloxane and polydialkylcyclosiloxane.

In an embodiment, the at least one silicone fluid comprises a mixture of silicone fluid components, wherein a first silicone fluid component has a viscosity ranging from about 500 to about 5,000 centistokes at 25° C. and a second silicone fluid component has a viscosity ranging from about 5000 to about 20,000 centistokes at 25° C. In an embodiment, the first silicone fluid component has a viscosity ranging from about 800 to about 3,000 centistokes at 25° C. and the second silicone fluid component has a viscosity ranging from about 8000 to about 18,000 centistokes at 25° C. In an embodiment, the first silicone fluid component has a viscosity ranging from about 1000 to about 2,000 centistokes at 25° C. and the second silicone fluid component has a viscosity ranging from about 10000 to about 15,000 centistokes at 25° C.

In embodiments, the first silicone fluid component is present as about 0.01% by weight to about 12% by weight, or about 0.05% by weight to about 10% by weight, or alternatively about 0.1% by weight to about 8% by weight of the composition. In embodiments, the second silicone fluid component is present as about 0.01% by weight to about 12% by weight, or about 0.05% by weight to about 10% by weight, or alternatively about 0.1% by weight to about 8% by weight of the composition.

The composition of this invention includes at least one wetting agent which aids in the spreading and leveling of silicone oils onto treated surfaces. Examples of wetting agents are disclosed, for example, in U.S. Patent Application Publication No. 2005/0250668 to Serobian et al., which is incorporated by reference herein. Non-limiting examples of suitable wetting agents include, e.g., polyalkyleneoxide-modified polydimethylsiloxane (available from General Electric as Silwet® 7650), polyalkyleneoxide-modified heptamethyltri-siloxane (also available from General Electric as Silwet® 7280 and Silwet® 7608), silicone glycol copolymer surfactant (available from Dow Corning as Dow Corning® 57) and the Dow Corning silicone polyether superwetting agent designated "Dow Corning® Q2-5211". The wetting agent used in the present invention is preferably a silicone polyether wetting agent such as the aforementioned Dow Corning® Q2-5211 wetting agent.

The compositions used in the present method comprise at least one wetting agent in an amount from about 0.001 to about 2%. In an embodiment, the wetting agent is used at a level of from about 0.1 to 1.0%, or from about 0.2 to about 0.6%, or about 0.4 to about 0.6%, by weight of the composition of this invention.

The hydrophobic additive may be any suitable additive used to enhance water repellency of the residue remaining on the cleaned surface. In an embodiment, the hydrophobic additive is a siloxane cross-linking film-former. In an embodiment, the Siloxane cross-linking film-former is an MQ siloxane component, i.e. the co-hydrolysis product of tetraalkoxysilane (Q unit) and trimethylethoxysilane (M unit). Examples of commercially available siloxane cross-linking film-formers include BELSIL® TMS 803 Trimethylsiloxysilicate from Wacker Chemie AG.

In an embodiment, the hydrophobic additive is an air-drying, air-curing silicone provided in a "formulated blend" conventionally used as a fabric finish for natural and synthetic fabrics. Examples of such air-drying, air-curing silicones are DOW CORNING® FBL-0563 Formulated Blend, XIAMETER® FBL-0563 Formulated Blend and DOW CORNING® C2-0563 Repellent.

The compositions used in the present method comprise at least one hydrophobic additive in an amount from about 0.1 to about 3%.

The compositions used in the present method comprise water. The water may be deionized, industrial soft water, or any suitable grade of water. Preferably, the water used in the aqueous dispersion is deionized or distilled water.

The water should be present at a level of greater than 60% by weight, more preferably from about 65% to about 98% by weight, and most preferably, from about 70% to about 95% by weight.

The present compositions optionally contain one or more of the following adjuncts: lubricants, leveling agents, pH adjusters, buffers, spreading agents, brighteners, fluorescent whitening agents, ultraviolet (UV) absorbers, UV scatterers, infra-red (IR) absorbers, IR scatterers, free-radical quenchers, free-radical stabilizers, excited state quenchers (ESQ) and/or anti-oxidants, and their mixtures. Examples of UV effective agents suitable for use include, but are not limited to Tinuvin 123, Tinuvin 292, Tinuvin 384, Tinuvin 171 and Tinuvin 99, all available from the Ciba Chemical Company.

Other adjuncts include, but are not limited to, acids, electrolytes, dyes and/or colorants and/or pigments, solubilizing materials, stabilizers, thickeners, defoamers, hydrotropes, cloud point modifiers, preservatives, and other polymers and their mixtures. The solubilizing materials, when used, include, but are not limited to, hydrotropes (e.g. water soluble salts of low molecular weight organic acids such as the sodium and/or potassium salts of toluene, cumene, and xylene sulfonic acid). Defoamers, when used, include, but are not limited to, silicones, aminosilicones, silicone blends, and/or silicone/hydrocarbon blends.

These and other suitable additives which can be used in the composition of the present disclosure are disclosed, for example, in U.S. Pat. Nos. 7,378,382 and 7,399,738, the disclosures of which are incorporated herein by reference.

The adjuncts can be present at a level of from about 0.0001% to about 20%, alternatively from about 0.001% to about 10%, or alternatively from about 0.01% to about 5% by weight.

In a method for application of the composition of this disclosure, the composition can be loaded into an applicator wipe in sufficient quantity so that it can be used to wipe away bugs and tar like substances from exterior surfaces of vehicles. This facilitates users ability to clean and remove contaminants from exterior surfaces of their vehicles and easily dispose of the wipe and the used composition as well. The composition can also be loaded into bottles, which can be directly applied to surface by methods of trigger spray or an aerosol can, and wiped away with a wipe.

In an embodiment, the applicator wipe may be a fabric or sponge material suitable for coating and imparting light contact to the surface to be cleaned. In an embodiment, the applicator wipe is selected from the group consisting of a wipe, woven fabric, non-woven fabric, microfiber fabric, sponge, towelette, pad and/or combination. In an embodiment, the applicator wipe is selected from woven fabric, non-woven fabric or a sponge. In an embodiment, the applicator wipe is selected from woven fabric, non-woven fabric prepared from a natural fabric, such as cotton, or a man-made material, such as rayon, nylon, polyester, and the like. In an embodiment, the applicator wipe is a sponge made from natural or man-made material. In an embodiment, the sponge is further provided with a scrubbing surface, such as a laminated cloth material.

In an embodiment, the wipe that has been pre-loaded with the cleaning composition is provided in a pre-packaged format for individual use.

EXAMPLES

Representative embodiments of the present invention will now be described with reference to the following examples that illustrate the principles and practice of the present invention.

Example 1

A cleaning composition is prepared having a relatively low viscosity, suitable for pre-loading into a wipe as follows.

| Component | Function | Component Quantity |
|---|---|---|
| Deionized or RO Water | Carrier | 94.250 |
| Novemer EC-1 (Lubrizol) | Thickener | 0.350 |
| Naphthenic Paraffinic Solvent FP210; LPA-210 | Solvent | 4.000 |
| Belsil TMS 803 | Hydrophobic Additive | 0.500 |
| Silicone Fluid H, Silicone Fluyid 12,500 cSt | Gloss enhancer | 0.500 |
| 5211 Superwetting agent Methyl | Wetting Agent | 0.200 |

-continued

| Component | Function | Component Quantity |
|---|---|---|
| prophylhydroxide ethoxylated Dantogard Plud Liquid (Lonza) | Preservative | 0.200 |

Example 2

A cleaning composition having a viscosity suitable delivery by spray bottle was prepared using the following formulation.

| Component | Purpose | Component Quantity |
|---|---|---|
| Deionized or RO Water | Carrier | 88.550 |
| Novemer EC-1 (Lubrizol) | Thickener | 0.350 |
| Acusol 801S (Dow) | Rheology Modifier | 0.250 |
| TEA 99 LFG | Base to swell rheology modifier | 0.250 |
| Silicone Fluid E, Silicone Fluid 1000 cSt | Gloss enhancer | 0.650 |
| Silicone Fluid H, Silicone Fluid 12,500 cSt | Gloss enhancer | 0.350 |
| Oderless Mineral Spirits | Solvent | 8.000 |
| Dantogard Plus Liquid (Lonza) | Preservative | 0.200 |
| FBL-0563 Formulated Blend | Hydrophobically modified Additive | 1.200 |
| 5211 Superwetting agent - Methyl propylhydroxide ethoxylated | Wetting agent | 0.200 |

As used herein, the terms "about" or "approximately" mean within an acceptable range for the particular parameter specified as determined by one of ordinary skill in the art, which will depend in part on how the value is measured or determined, e.g., the limitations of the sample preparation and measurement system. Examples of such limitations include preparing the sample in a wet versus a dry environment, different instruments, variations in sample height, and differing requirements in signal-to-noise ratios. For example, "about" can mean greater or lesser than the value or range of values stated by 1/10 of the stated values, but is not intended to limit any value or range of values to only this broader definition. For instance, a concentration value of about 30% means a concentration between 27% and 33%. Each value or range of values preceded by the term "about" is also intended to encompass the embodiment of the stated absolute value or range of values. Alternatively, particularly with respect to biological systems or processes, the term can mean within an order of magnitude, preferably within 5-fold, and more preferably within 2-fold, of a value.

Throughout this specification and claims, unless the context requires otherwise, the word "comprise", and variations such as "comprises" and "comprising", will be understood to imply the inclusion of a stated integer or step or group of integers or steps but not the exclusion of any other integer or step or group of integer or step. When used herein "consisting of" excludes any element, step, or ingredient not specified in the claim element. When used herein, "consisting essentially of" does not exclude materials or steps that do not materially affect the basic and novel characteristics of the claim. In the present disclosure of various embodiments, any of the terms "comprising", "consisting essentially of" and "consisting of" used in the description of an embodiment may be replaced with either of the other two terms.

All patents, patent applications (including provisional applications), and publications cited herein are incorporated by reference as if individually incorporated for all purposes. Unless otherwise indicated, all parts and percentages are by weight and all molecular weights are weight average molecular weights. The foregoing detailed description has been given for clarity of understanding only. No unnecessary limitations are to be understood therefrom. The invention is not limited to the exact details shown and described, for variations obvious to one skilled in the art will be included within the invention defined by the claims.

What is claimed is:

1. An automotive cleaning surface composition, the composition comprising:
   a) at least one hydrocarbon solvent in an amount from about 3 weight percent to about 20 weight percent of the composition,
   b) at least one thickener/rheology modifier in an amount from about 0.01 weight percent to about 3 weight percent of the composition, wherein the at least one thickener/rheology modifier comprises at least one hydrophilic monomer,
   c) at least one silicone fluid having a viscosity ranging from about 500 centistokes to about 20,000 centistokes at 25° C., present in an amount from about 0.1 weight percent to about 3 weight percent of the composition,
   d) at least one wetting agent in an amount from about 0.001 weight percent to about 1 weight percent of the composition, comprising polyalkyleneoxide-modified heptamethyltri-siloxane or silicone glycol copolymer,
   e) only one hydrophobic additive in an amount from about 0.1 weight percent to about 3 weight percent of the composition, wherein the hydrophobic additive comprises an MQ siloxane component, and
   f) water in an amount from about 70 weight percent to about 98 weight percent of the composition.

2. The composition of claim 1, wherein the at least one hydrocarbon solvent comprises a paraffinic naphthenic solvent.

3. The composition of claim 1, wherein the at least one thickener/rheology modifier comprises a blend of acrylates, acrylamide copolymer, mineral oil and polysorbate 85.

4. The composition of claim 1, wherein the at least one silicone fluid comprises a mixture of silicone fluid components, wherein a first silicone fluid component has a viscosity ranging from about 500 centistokes to about 5,000 centistokes at 25° C. and a second silicone fluid component has a viscosity ranging from about 5000 centistokes to about 20,000 centistokes at 25° C.

5. The composition of claim 4, wherein the first silicone fluid component has a viscosity ranging from about 800 centistokes to about 3,000 centistokes at 25° C. and the second silicone fluid component has a viscosity ranging from about 8000 centistokes to about 18,000 centistokes at 25° C.

6. The composition of claim 4, wherein the first silicone fluid component has a viscosity ranging from about 1000 centistokes to about 2,000 centistokes at 25° C. and the second silicone fluid component has a viscosity ranging from about 10000 centistokes to about 15,000 centistokes at 25° C.

7. The composition of claim 1, wherein the composition has a viscosity of from about 5000 centistokes to about 15000 centistokes.

8. The composition of claim 1, wherein the composition has a viscosity of from about 1500 centistokes to about 7000 centistokes.

9. The composition of claim 1, wherein the composition has a viscosity of from about 0 cps to about 500 cps.

10. The composition of claim 1, wherein the MQ siloxane component comprises a co-hydrolysis product of a tetraalkoxysilane Q unit and a trimethylethoxysilane M unit.

11. A bottle comprising the composition of claim 1.

12. A spray bottle comprising the composition of claim 1.

13. A pre-packaged wipe comprising the composition of claim 1.

* * * * *